(12) United States Patent
Kato et al.

(10) Patent No.: US 6,676,542 B2
(45) Date of Patent: Jan. 13, 2004

(54) MULTI-PIECE SOLID GOLF BALL

(75) Inventors: Akira Kato, Kobe (JP); Keiji Moriyama, Kobe (JP)

(73) Assignee: Sumitomo Rubber Industries, Ltd., Hyogo-ken (JP)

(*) Notice: Subject to any disclaimer, the term of this patent is extended or adjusted under 35 U.S.C. 154(b) by 0 days.

(21) Appl. No.: 10/338,722

(22) Filed: Jan. 9, 2003

(65) Prior Publication Data

US 2003/0166422 A1 Sep. 4, 2003

(30) Foreign Application Priority Data

Jan. 10, 2002 (JP) ........................ 2002-003526

(51) Int. Cl.$^7$ .................. A63B 37/04; A63B 37/06; A63B 37/12; A63B 37/14; A63B 37/00

(52) U.S. Cl. .................. 473/377; 473/371; 473/351; 473/378

(58) Field of Search .................. 473/351–378

(56) References Cited

U.S. PATENT DOCUMENTS

| | | | |
|---|---|---|---|
| 5,711,723 A | 1/1998 | Hiraoka et al. | |
| 5,830,085 A | 11/1998 | Higuchi et al. | |
| 5,929,189 A * | 7/1999 | Ichikawa et al. | 528/76 |
| 6,045,460 A * | 4/2000 | Hayashi et al. | 473/376 |
| 6,135,898 A * | 10/2000 | Higuchi et al. | 473/374 |
| 6,206,791 B1 * | 3/2001 | Moriyama et al. | 473/376 |
| 6,248,029 B1 * | 6/2001 | Maruko | 473/374 |
| 6,271,296 B1 * | 8/2001 | Nakamura et al. | 524/423 |
| 6,371,869 B1 * | 4/2002 | Kato et al. | 473/365 |
| 6,379,268 B1 * | 4/2002 | Yamagishi et al. | 473/371 |
| 6,394,912 B1 * | 5/2002 | Nakamura et al. | 473/371 |
| 6,431,998 B1 * | 8/2002 | Nakamura et al. | 473/371 |
| 6,565,455 B2 * | 5/2003 | Hayashi et al. | 473/371 |
| 6,572,493 B2 * | 6/2003 | Ohama | 473/373 |
| 6,593,443 B2 * | 7/2003 | Iwami | 528/63 |

FOREIGN PATENT DOCUMENTS

| | | |
|---|---|---|
| JP | 8-332247 A | 12/1996 |
| JP | 9-313643 A | 12/1997 |
| JP | 11-151320 A | 6/1999 |

* cited by examiner

*Primary Examiner*—Paul T. Sewell
*Assistant Examiner*—Alvin A. Hunter, Jr.
(74) *Attorney, Agent, or Firm*—Birch, Stewart, Kolasch & Birch, LLP

(57) ABSTRACT

The present invention provides a multi-piece solid golf ball, which is superior in flight distance, spin performance, shot feel and scuff resistance. The present invention relates to a multi-piece solid golf ball comprising a core composed of a center and an intermediate layer formed on the center, and a cover formed on the core, wherein the center has a diameter of 10 to 20 mm and a central point hardness in JIS-A hardness of 30 to 90, the intermediate layer has a surface hardness in Shore D hardness of 50 to 70 the cover comprises polyurethane-based thermoplastic elastomer as a main component, and has a hardness in Shore D hardness of 40 to 60 and a thickness of 0.3 to 1.5 mm.

3 Claims, 1 Drawing Sheet

MULTI-PIECE SOLID GOLF BALL

This nonprovisional application claims priority under 35 U.S.C. § 119(a) on Patent Application No. 2002-003526 filed in JAPAN on Jan. 10, 2002, which is herein incorporated by reference.

FIELD OF THE INVENTION

The present invention relates to a multi-piece solid golf ball. More particularly, it relates to a multi-piece solid golf ball, which is superior in flight distance, spin performance, shot feel and scuff resistance.

BACKGROUND OF THE INVENTION

Amateur golfers generally regard flight distance as most important factor for golf balls and use a solid golf ball having good rebound characteristics and little spin amount, such as a two-piece golf ball, by choice. On the other hand, professional golfers and high level-amateur golfers generally regard controllability as most important factor for golf balls, and regard soft and good shot feel and flight performance as the next important factor for golf balls. Therefore they have mainly used thread wound golf balls, which have good controllability and soft and good shot feel. However, since the thread wound golf ball has a structure easily putting spin thereon, there has been a problem that the spin amount is large when hit by any type of golf club, which reduces the flight distance. In order to solve the problem, many solid golf balls having good shot feel and excellent flight performance while maintaining good controllability have been proposed in Japanese Patent Kokai Publication Nos. 332247/1996, 313643/1997, 151320/1999 and the like.

Japanese Patent Kokai Publication No. 332247/1996 suggests a three-piece solid golf ball comprising a core having a two-layered structure of an inner core and outer core, and a cover. The inner core has a diameter of 25 to 37 mm, a center hardness in JIS-C hardness of 60 to 85 and a hardness difference in JIS-C hardness from the center point to the surface of the inner core of not more than 4, the outer core has a surface hardness in JIS-C hardness of 75 to 90, and the cover has a flexural modulus of 1,200 to 3,600 kg/cm$^2$.

Japanese Patent Kokai Publication No. 313643/1997 suggests a three-piece solid golf ball that an intermediate layer formed from thermoplastic resin is placed between a core and a cover. The core has a center hardness in JIS-C hardness of not more than 75, a surface hardness in JIS-C hardness of not more than 85, the surface hardness is higher than the center hardness by 5 to 25, a hardness of the intermediate layer is higher than the surface hardness of the core by less than 10, and a hardness of the cover is higher than that of the intermediate layer.

Japanese Patent Publication No. 151320/1999 suggests a three-piece solid golf ball comprising a core having a two-layered structure of an inner core and outer core, and a cover. The inner core has a diameter of 15 to 22 mm and a Shore D hardness of 40 to 70, the outer core has a hardness in JIS-C hardness of 40 to 75, the inner and outer core are formed from rubber composition, and the cover has a thickness of 0.5 to 3 mm.

However, in the golf balls, there has been a problem that the spin amount is large, which reduces the flight distance, when hit by a driver to middle iron club such that sufficient flight distance is required. In addition, in order to improve the flight distance, the shot feel is hard or heavy, which is not sufficiently obtained.

OBJECTS OF THE INVENTION

A main object of the present invention is to provide a multi-piece solid golf ball, which is superior in flight distance, spin performance, shot feel and scuff resistance.

According to the present invention, the object described above has been accomplished by providing a multi-piece solid golf ball comprising a center, an intermediate layer and a cover, using polyurethane-based thermoplastic elastomer for the cover, and adjusting a diameter and central point hardness of the center, a surface hardness of the intermediate layer and a thickness and hardness of the cover to specified ranges, thereby providing a multi-piece solid golf ball, which is superior in flight distance, spin performance, shot feel and scuff resistance.

This object as well as other objects and advantages of the present invention will become apparent to those skilled in the art from the following description with reference to the accompanying drawings.

BRIEF EXPLANATION OF DRAWINGS

The present invention will become more fully understood from the detailed description given hereinbelow and the accompanying drawings which are given by way of illustration only, and thus are not limitative of the present invention, and wherein.

SUMMARY OF THE INVENTION

Figure 1:
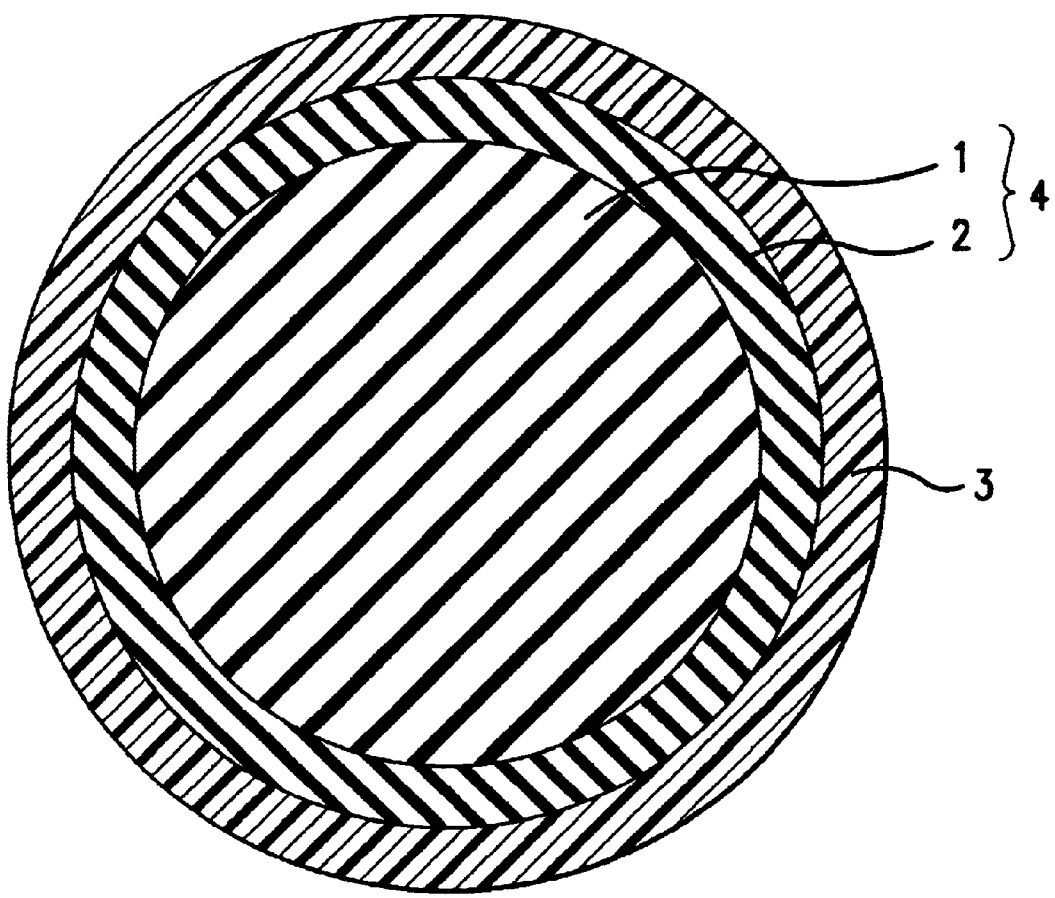
FIG. 1 is a schematic cross section illustrating one embodiment of the golf ball of the present invention.

The present invention provides a multi-piece solid golf ball comprising a core composed of a center and an intermediate layer formed on the center, and a cover formed on the core, wherein the center has a diameter of 10 to 20 mm and a central point hardness in JIS-A hardness of 30 to 90, the intermediate layer has a surface hardness in Shore D hardness of 50 to 70, the cover comprises polyurethane-based thermoplastic elastomer as a main component, and has a hardness in Shore D hardness of 40 to 60 and a thickness of 0.3 to 1.5 mm.

In the conventional three-piece golf ball, since a center harder than that of the present invention is used, it is required to use a material harder than the center as an intermediate layer, and the resulting golf ball is hard. Therefore, a diameter of the center, which is large, is within the range of 25 to 41 mm. A deformation amount of the golf ball when hit by a middle iron club to a driver is small and the spin amount is large, and the flight distance is not sufficiently obtained. There has been golf balls having small diameter of the center, but the target therefor is a player who swings the golf club at low head speed, and then the deformation amount when hit at low head speed is large. Therefore, the hardness of the intermediate layer is low and the central point hardness of the center is high, and the spin amount when hit by a middle iron club to a driver is large, which reduces the flight distance. Since the hardness of the intermediate layer is low, the rebound characteristics are not sufficiently obtained, which reduces the flight distance. In addition, the shot feel is poor such that the rebound characteristics are poor.

The present inventors have developed a three-piece solid golf ball in different point of view from the conventional point, which the hardness at the distance of 5 to 10 mm from the central point of the center has great effect on the restraint of the spin amount when hit by a middle iron club to a driver. Thereby the three-piece solid golf ball is accomplished by decreasing the diameter and hardness of the center, of which the spin amount is small when hit by a middle iron club to a driver to improve the flight distance, of which the spin amount is large when hit by a short iron club and the like to reduce the flight distance, and the controllability is excellent, and of which the shot feel is good.

In order to put the present invention into a more suitable practical application, it is desired that the center and intermediate layer comprise cis-1,4-polybutadiene rubber as a main component; and the polyurethane-based thermoplastic elastomer be formed by using cycloaliphatic diisocyanate.

DETAILED DESCRIPTION OF THE INVENTION

The multi-piece solid golf ball of the present invention will be explained with reference to the accompanying drawing in detail. FIG. 1 is a schematic cross section illustrating one embodiment of the golf ball of the present invention. As shown in FIG. 1, the golf ball of the present invention comprises a core 4 composed of a center 1 and an intermediate layer 2 formed on the center, and a cover 3 covering the core. The cover may have single-layered structure or multi-layered structure, which has two or more layers. In FIG. 1, in order to explain the golf ball of the present invention simply, a golf ball having one layer of cover 3, that is, a three-piece solid golf ball, will be used hereinafter for explanation. However, the golf ball of the present invention may be applied for the golf ball having two or more layers of cover.

In the present invention, it is desired for the core 4, that is, both the center 1 and the intermediate layer 2 to comprise polybutadiene rubber as a main component. The core is preferably obtained by vulcanizing or press-molding the rubber composition using a method and condition, which have been conventionally used for cores of solid golf balls. The rubber composition contains a base rubber, a co-crosslinking agent, an organic peroxide, a filler and an antioxidant.

The base rubber used in the present invention may be natural rubber and/or synthetic rubber, which has been conventionally used for solid golf balls. Preferred is high-cis polybutadiene rubber containing a cis-1,4 bond of not less than 40%, preferably not less than 80%. The high-cis polybutadiene rubber may be optionally mixed with natural rubber, polyisoprene rubber, styrene-butadiene rubber, ethylene-propylene-diene rubber (EPDM) and the like.

The co-crosslinking agent can be $\alpha$, $\beta$-unsaturated carboxylic acids having 3 to 8 carbon atoms (e.g. acrylic acid, methacrylic acid, etc.), or mono or divalent metal salts, such as zinc or magnesium salts thereof; a functional monomers (such as trimethylolpropane trimethacrylate and the like); or a combination thereof. The preferred co-crosslinking agent is zinc acrylate, because it imparts high rebound characteristics to the resulting golf ball. The amount of the co-crosslinking agent in the center 1 is from 5 to 20 parts by weight, preferably from 6 to 18 parts by weight, and the amount of the co-crosslinking agent in the intermediate layer 2 is from 30 to 50 parts by weight, preferably from 32 to 48 parts by weight, based on 100 parts by weight of the polybutadiene. When the amount of the co-crosslinking agent is too small, the core is too soft, and the rebound characteristics are degraded, which reduces the flight distance. In addition, since soft material is used for the cover, the resulting golf ball is too soft, which degrades the shot feel. On the other hand, when the amount of the co-crosslinking agent is too large, the core is too hard, and the shot feel of the resulting golf ball is poor.

The organic peroxide, which acts as vulcanization initiator, includes, for example, dicumyl peroxide, 1,1-bis (t-butylperoxy)-3,3,5-trimethylcyclohexane, 2,5-dimethyl-2,5-di(t-butylperoxy) hexane, di-t-butyl peroxide and the like. The preferred organic peroxide is dicumyl peroxide. The amount of the organic peroxide in both the center 1 and the intermediate layer 2 is from 0.5 to 5.0 parts by weight, preferably 0.7 to 4.0 parts by weight, based on 100 parts by weight of the polybutadiene. When the amount of the organic peroxide is smaller than 0.5 parts by weight, the core is too soft, and the rebound characteristics of the resulting golf ball are degraded, which reduces the flight distance. On the other hand, when the amount of the organic peroxide is larger than 5.0 parts by weight, the core is too hard, and the shot feel of the resulting golf ball is poor.

The filler, which can be typically used for the core of solid golf ball, includes for example, inorganic filler (such as zinc oxide, barium sulfate, calcium carbonate, magnesium oxide and the like), high specific gravity metal powder filler (such as tungsten powder, molybdenum powder and the like), and the mixture thereof. The amount of the filler in the center 1 is from 10 to 30 parts by weight, preferably from 12 to 25 parts by weight, and the amount of the filler in the intermediate layer 2 is from 4 to 20 parts by weight, preferably from 5 to 18 parts by weight, based on 100 parts by weight of the polybutadiene. When the amount of the filler is too small, it is required to contain a large amount of the filler in order to obtain the desired weight of the golf ball. Therefore, the rebound characteristics of the resulting golf ball are degraded. On the other hand, when the amount of the filler is too large, it is difficult to adjust the weight of the resulting golf ball to a proper range.

The rubber compositions for the center 1 and intermediate layer 2 of the golf ball of the present invention can contain other components, which have been conventionally used for preparing the core of solid golf balls, such as organic sulfide compound or antioxidant. If used, the amount is preferably 0.5 to 5.0 parts by weight, preferably 0.7 to 4.0 parts by weight, based on 100 parts by weight of the base rubber.

The center 1 used for the golf ball of the present invention can be obtained by uniformly mixing the above rubber composition, followed by vulcanizing and press molding in a mold. The vulcanization, of which the condition is not limited, is conducted at 130 to 180° C. and 2.9 to 9.8 MPa for 10 to 60 minutes.

In the golf ball of the present invention, it is required for the center 1 to have a diameter of 10 to 20 mm, preferably 12 to 19 mm, more preferably 14 to 16 mm. When the diameter is smaller than 10 mm, the spin amount at the time of hitting is high, and the hit golf ball creates blow-up trajectory, which reduces the flight distance. On the other hand, when the diameter is larger than 20 mm, the resulting golf ball is too soft, and the rebound characteristics are degraded. In addition, the golf ball has poor shot feel such that the rebound characteristics are poor.

In the golf ball of the present invention, it is required for the center 1 to have a central point hardness in JIS-A hardness of 30 to 90, preferably 35 to 88, more preferably 40 to 85, most preferably 48 to 81. When the central point hardness is lower than 30, the rebound characteristics of the center are degraded, and those of the resulting golf ball are degraded, which reduces the flight distance. On the other hand, when the hardness is higher than 90, the technical effects of restrain the spin amount at the time of hitting are not sufficiently obtained. In addition, the shot feel is poor. The term "central point hardness of the center" as used herein means the hardness determined by cutting the center into two equal parts and then measuring a hardness at the central point in section.

The intermediate layer 2 is then formed on the center 1. The intermediate layer 2 of the present invention may be formed by conventional methods, which have been known to the art and used for forming the two-layer structured core of the golf balls. For example, there can be used a method comprising mixing the intermediate layer composition, covering the mixture on the center into a concentric sphere, and then press-molding in the mold at 130 to 180° C. for 10 to 40 minutes; or a method comprising molding the intermediate layer composition into a semi-spherical half-shell, then covering the center 1 with the two half-shells, followed by integrally press-molding in the mold at 130 to 180° C. for 10 to 40 minutes.

In the golf ball of the present invention, it is desired for the intermediate layer 2 to have a thickness of 10.0 to 16.0 mm, preferably 10.5 to 15.0 mm, more preferably 12.0 to 14.0 mm. When the thickness is smaller than 10.0 mm, the rebound characteristics of the resulting golf ball are degraded, which reduces the flight distance. On the other hand, when the thickness is larger than 16.0 mm, since soft material is used for the cover, the shot feel is hard and poor.

In the golf ball of the present invention, it is required for the intermediate layer to have a surface hardness in Shore D hardness of 50 to 70, preferably 52 to 68, more preferably 55 to 67, most preferably 62 to 67. When the surface hardness is lower than 50, the resulting core is too soft, and the golf ball having proper hardness is not obtained. On the other hand, when the hardness is higher than 70, the core is too hard, and the shot feel of the resulting golf ball is poor. In addition, the spin amount at the time of hitting is high, which reduces the flight distance. The term "a surface hardness of the intermediate layer" as used herein means the surface hardness in Shore D hardness of the core 4 having a two-layered structure, which is formed by integrally press-molding the intermediate layer 2 on the center 1.

In the golf ball of the present invention, it is desired for the core 4 to have a diameter of 37 to 43 mm, preferably 38 to 42 mm, more preferably 39 to 41 mm. When the diameter of the core is smaller than 37 mm, it is required to increase the thickness of the cover in order to conform the diameter of the resulting golf ball to the regulations for golf balls, and the spin amount when hit by a driver is increased, which reduces the flight distance. On the other hand, when the diameter of the core is larger than 43 mm, a diameter of the resulting golf ball is too large, and air resistance on the fly is large, which reduces flight distance.

In the golf ball of the present invention, it is desired for the core 4 to have a deformation amount of 2.4 to 3.6 mm, preferably 2.6 to 3.4 mm, more preferably 2.8 to 3.2 mm, when applying from an initial load of 98 N to a final load of 1274 N on the core. When the deformation amount is smaller than 2.4 mm, the deformation amount when hit by a driver to middle iron club is small, and the spin amount at the time of hitting is increased, which reduces the flight distance. In addition, the shot feel is hard and poor. On the other hand, when the deformation amount is larger than 3.6 mm, the rebound characteristics of the resulting golf ball are degraded, which reduces the flight distance. In addition, the shot feel of the resulting golf ball is too soft and poor such that rebound characteristics are poor.

At least one layer of the cover 3 is covered on the core 4. In the golf ball of the present invention, it is required for the cover 3 to have a thickness of 0.3 to 1.5 mm, preferably 0.5 to 1.2 mm, more preferably 0.7 to 1.0 mm. When the thickness of the cover is smaller than 0.3 mm, the technical effects of softening the cover are not sufficiently obtained, and the spin amount at short iron to approach shot is small, which degrades the controllability. On the other hand, when the thickness is larger than 1.5 mm, the rebound characteristics of the resulting golf ball are degraded. In addition, the spin amount at the time of hitting is increased, the hit golf ball creates blow-up trajectory, which reduces the flight distance.

In the golf ball of the present invention, it is required for the cover 3 to have a Shore D hardness of 40 to 60, preferably 42 to 58, more preferably 45 to 55. When the hardness is lower than 40, the spin amount when hit by a driver to middle iron club is increased, and the hit golf ball creates blow-up trajectory, which reduces the flight distance. On the other hand, when the hardness is higher than 60, the impact force at the time of hitting is large, and the shot feel is poor. In addition, the spin amount at short iron to approach shot is decreased, and the controllability is poor. The term "a hardness of the cover" as used herein is determined by measuring a hardness (slab hardness) using a sample of a stack of the three or more heat and press molded sheets having a thickness of about 2 mm from the composition for the cover, which had been stored at 23° C. for 2 weeks.

In the golf ball of the present invention, it is desired for the cover to comprise polyurethane-based thermoplastic elastomer as a main component in view of scuff resistance, preferably polyurethane-based thermoplastic elastomer formed by using cycloaliphatic diisocyanate in view of rebound characteristics, scuff resistance, yellowing resistance and the like.

Examples of the cycloaliphatic diisocyanates include one or combination of two or more selected from the group consisting of 4,4'-dicyclohexylmethane diisocyanate ($H_{12}MDI$), which is hydrogenated compound of 4,4'-diphenylmethane diisocyanate (MDI); 1,3-bis (isocyanatomethyl)cyclohexane ($H_6XDI$), which is hydrogenated compound of xylylene diisocyanate (XDI); isophorone diisocyanate (IPDI); and trans-1,4-cyclohexane diisocyanate (CHDI). Preferred is the $H_{12}MDI$ in view of general-purpose properties and processability.

Examples of the polyurethane-based thermoplastic elastomers include polyurethane-based thermoplastic elastomer formed by using the $H_{12}MDI$, which is commercially available from BASF Polyurethane Elastomers Co., Ltd. under the trade name "Elastollan" (such as "Elastollan XNY585", "Elastollan XNY90A", "Elastollan XNY97A") and the like.

As the materials used in the cover 3 of the present invention, the above polyurethane-based thermoplastic elastomer may be used alone, but the polyurethane-based thermoplastic elastomer may be used in combination with at least one of the other thermoplastic elastomer, diene-based block copolymer, ionomer resin and the like. Examples of the other thermoplastic elastomers include the other polyurethane-based thermoplastic elastomer, polyamide-based thermoplastic elastomer, polyester-based thermoplastic elastomer, polystyrene-based thermoplastic elastomer, polyolefin-based thermoplastic elastomer and the like. The other thermoplastic elastomer may have function group, such as carboxyl group, glycidyl group, sulfone group, epoxy group and the like.

Examples of the other thermoplastic elastomers include polyurethane-based elastomer, which is commercially available from BASF Polyurethane Elastomers Co., Ltd. under the trade name of "Elastollan" (such as "Elastollan ET880");

polyamide-based thermoplastic elastomer, which is commercially available from Atofina Japan Co., Ltd. under the trade name of "Pebax" (such as "Pebax 2533"); polyester-based thermoplastic elastomer, which is commercially available from Toray-Du Pont Co., Ltd. under the trade name of "Hytrel" (such as "Hytrel 3548", "Hytrel 4047"); styrene-based thermoplastic elastomer available from Asahi Chemical Industry Co., Ltd. under the trade name "Tuftec" (such as "Tuftec H1051"); olefin-based thermoplastic elastomer available from Mitsubishi Chemical Co., Ltd. under the trade name "Thermoran" (such as "Thermoran 3981N"); polyolefin-based thermoplastic elastomer, which is commercially available from Sumitomo Chemical Co., Ltd. under the trade name of "Sumitomo TPE" (such as "Sumitomo TPE3682" and "Sumitomo TPE9455"); and the like.

The diene-based block copolymer is a block copolymer or partially hydrogenated block copolymer having double bond derived from conjugated diene compound. The base bock copolymer is block copolymer composed of block polymer block A mainly comprising at least one aromatic vinyl compound and polymer block B mainly comprising at least one conjugated diene compound. The partially hydrogenated block copolymer is obtained by hydrogenating the block copolymer. Examples of the aromatic vinyl compounds comprising the block copolymer include styrene, α-methyl styrene, vinyl toluene, p-t-butyl styrene, 1,1-diphenyl styrene and the like, or mixtures thereof. Preferred is styrene. Examples of the conjugated diene compounds include butadiene, isoprene, 1,3-pentadiene, 2,3-dimethyl-1,3-butadiene and the like, or mixtures thereof. Preferred are butadiene, isoprene and combinations thereof. Examples of the diene block copolymers include an SBS (styrene-butadiene-styrene) block copolymer having polybutadiene block with epoxy groups or SIS (styrene-isoprene-styrene) block copolymer having polyisoprene block with epoxy groups and the like. Examples of the diene block copolymers which is commercially available include the diene block copolymers, which are commercially available from Daicel Chemical Industries, Ltd. under the trade name of "Epofriend" (such as "Epofriend A1010"), the diene-based block copolymers, which are commercially available from Kuraray Co., Ltd. under the trade name of "Septon" (such as "Septon HG-252" and the like) and the like.

The ionomer resin may be a copolymer of ethylene and α,β-unsaturated carboxylic acid, of which a portion of carboxylic acid groups is neutralized with metal ion, or a terpolymer of ethylene, α,β-unsaturated carboxylic acid and α,β-unsaturated carboxylic acid ester, of which a portion of carboxylic acid groups is neutralized with metal ion. Examples of the α,β-unsaturated carboxylic acid in the ionomer include acrylic acid, methacrylic acid, fumaric acid, maleic acid, crotonic acid and the like, and preferred are acrylic acid and methacrylic acid. Examples of the α,β-unsaturated carboxylic acid ester in the ionomer include methyl ester, ethyl ester, propyl ester, n-butyl ester and isobutyl ester of acrylic acid, methacrylic acid, fumaric acid, maleic acid, crotonic acid and the like. Preferred are acrylic acid esters and methacrylic acid esters. The metal ion which neutralizes a portion of carboxylic acid groups of the copolymer or terpolymer includes a sodium ion, a potassium ion, a lithium ion, a magnesium ion, a calcium ion, a zinc ion, a barium ion, an aluminum, a tin ion, a zirconium ion, cadmium ion, and the like. Preferred are sodium ions, zinc ions, magnesium ions and the like, in view of rebound characteristics, durability and the like.

The ionomer resin is not limited, but examples thereof will be shown by a trade name thereof. Examples of the ionomer resins, which are commercially available from Du Pont-Mitsui Polychemicals Co., Ltd. include Hi-milan 1555, Hi-milan 1557, Hi-milan 1605, Hi-milan 1652, Hi-milan 1702, Hi-milan 1705, Hi-milan 1706, Hi-milan 1707, Hi-milan 1855, Hi-milan 1856 and the like. Examples of the ionomer resins, which are commercially available from Du Pont Co., include Surlyn 8945, Surlyn 9945, Surlyn 6320 and the like. Examples of the ionomer resins, which are commercially available from Exxon Chemical Co., include Iotek 7010, Iotek 8000 and the like. These ionomer resins may be used alone or in combination.

The amount of the other thermoplastic elastomer, diene block copolymer or ionomer resin is 0 to 40 parts by weight, preferably 0 to 30 parts by weight, based on 100 parts by weight of the base resin for the cover. When the amount is larger than 40 parts by weight, either scuff resistance, rebound characteristics or yellowing resistance are degraded.

The composition for the cover 3 used in the present invention may optionally contain pigments (such as titanium dioxide, etc.) and the other additives such as a dispersant, an antioxidant, a UV absorber, a photostabilizer and a fluorescent agent or a fluorescent brightener, etc., in addition to the resin component as long as the addition of the additives does not deteriorate the desired performance of the golf ball cover. If used, the amount of the pigment is preferably 0.1 to 5.0 parts by weight, based on 100 parts by weight of the base resin for the cover.

A method of covering on the core 4 with the cover 3 is not specifically limited, but may be a conventional method. For example, there can be used a method comprising molding the cover composition into a semi-spherical half-shell in advance, covering the core with the two half-shells, followed by press molding at 130 to 170° C. for 1 to 5 minutes, or a method comprising injection molding the cover composition directly on the core, which is covered with the cover, to cover it.

At the time of molding the cover, many depressions called "dimples" are formed on the surface of the golf ball. Furthermore, paint finishing or marking with a stamp may be optionally provided after the cover is molded for commercial purposes.

The golf ball of the present invention is formed, so that it has a diameter of not less than 42.67 mm (preferably 42.67 to 42.82 mm) and a weight of not more than 45.93 g, in accordance with the regulations for golf balls.

The diameter of golf balls is limited to not less than 42.67 mm in accordance with the regulations for golf balls as described above. Generally, when the diameter of the golf ball is large, air resistance of the golf ball on a flight is large, which reduces the flight distance. Therefore, most of golf balls commercially available are designed to have a diameter of 42.67 to 42.82 mm. The present invention is applicable to the golf balls having the diameter. There are golf balls having large diameter in order to improve the easiness of hitting. In addition, there are cases where golf balls having a diameter out of the regulations for golf balls are required depending on the demand and object of users. Therefore, it can be considered for golf balls to have a diameter of 42 to 44 mm, more widely 40 to 45 mm. The present invention is also applicable to the golf balls having the diameter.

EXAMPLES

The following Examples and Comparative Examples further illustrate the present invention in detail but are not to be construed to limit the scope of the present invention.

(1) Production of Core
(i) Production of Center

The rubber compositions for the center having the formulations shown in Tables 1 and 2 were mixed, and then vulcanized by press-molding in the mold at 165° C. for 20 minutes to obtain spherical centers. The weight, diameter, central point hardness and surface hardness of the resulting centers were measured. The results are shown in Tables 4 and 5.

(ii) Production of Two-layer Structured Core

The rubber compositions for the intermediate layer having the formulations shown in Tables 1 and 2 were mixed, and coated on the centers produced in the step (i) into a concentric sphere, and then vulcanized by press-molding at 165° C. for 20 minutes in the mold to obtain two-layer structured cores having a diameter of 41.2 mm and weight of 41.1 g. The thickness and surface hardness of the resulting intermediate layer were measured, and the deformation amount of the resulting two-layer structured core was measured. The results are shown in Tables 4 and 5.

TABLE 1

| | | (parts by weight) | | | |
|---|---|---|---|---|---|
| Core composition | | A | B | C | D | E |
| (Center composition) | | | | | | |
| BR11 | *1 | 100 | 100 | 100 | 100 | 100 |
| Zinc acrylate | | 6 | 9 | 15 | 3 | 25 |
| Zinc oxide | | 5 | 5 | 5 | 5 | 5 |
| Barium sulfate | | 22 | 21 | 18.5 | 23 | 14.5 |
| Dicumyl peroxide | | 1 | 1 | 1 | 1 | 1 |
| Diphenyl disulfide | | 0.5 | 0.5 | 0.5 | 0.5 | 0.5 |
| (Intermediate layer composition) | | | | | | |
| BR11 | *1 | 100 | 100 | 100 | 100 | 100 |
| Zinc acrylate | | 45 | 42 | 38 | 45 | 33 |
| Zinc oxide | | 5 | 5 | 5 | 5 | 5 |
| Barium sulfate | | 6 | 7.5 | 9 | 6 | 11 |
| Dicumyl peroxide | | 0.5 | 0.5 | 0.5 | 0.5 | 0.5 |

TABLE 2

| | | (parts by weight) | | | |
|---|---|---|---|---|---|
| Core Composition | | F | G | H | J |
| (Center composition) | | | | | |
| BR11 | *1 | 100 | 100 | 100 | 100 |
| Zinc acrylate | | 25 | 6 | 15 | 6 |
| Zinc oxide | | 5 | 5 | 5 | 5 |
| Barium sulfate | | 14.5 | 22 | 18.5 | 22 |
| Dicumyl peroxide | | 1 | 1 | 1 | 1 |
| Diphenyl disulfide | | 0.5 | 0.5 | 0.5 | 0.5 |
| (Intermediate layer composition) | | | | | |
| BR11 | *1 | 100 | 100 | 100 | 100 |
| Zinc acrylate | | 29 | 38 | 42 | 50 |
| Zinc oxide | | 5 | 5 | 5 | 5 |
| Barium sulfate | | 12.5 | 9 | 7.5 | 4 |
| Dicumyl peroxide | | 0.5 | 0.5 | 0.5 | 1.0 |

*1: BR-11 (trade name), high-cis polybutadiene commercially available from JSR Co., Ltd. (Content of 1,4-cis-polybutadiene: 96%)

(2) Preparation of Cover Compositions

The formulation materials for the cover shown in Table 3 were mixed using a kneading type twin-screw extruder to obtain pelletized cover compositions. The extrusion condition was, a screw diameter of 45 mm,
a screw speed of 200 rpm, and
a screw L/D of 35.

The formulation materials were heated at 160 to 260° C. at the die position of the extruder. Shore D hardness was measured, using a sample of a stack of the three or more heat and press molded sheets having a thickness of about 2 mm from each cover composition, which had been stored at 23° C. for 2 weeks. The results are shown in Tables 3 to 5 as the cover hardness.

TABLE 3

| | | (parts by weight) | | | |
|---|---|---|---|---|---|
| Cover composition | | I | II | III | IV |
| Elastollan XNY585 | *2 | 100 | — | — | — |
| Elastollan XNY90A | *3 | — | 100 | — | — |
| Elastollan XNY97A | *4 | — | — | 100 | — |
| Surlyn 8945 | *5 | — | — | — | 30 |
| Hi-milan AM7316 | *6 | — | — | — | 70 |
| Titanium dioxide | | 4 | 4 | 4 | 4 |
| Cover hardness (Shore D) | | 40 | 46 | 52 | 45 |

*2: Elastollan XNY585 (trade name), polyurethane-based thermoplastic elastomer formed by using 4,4'-dicyclohexylmethane diisocyanate ($H_{12}MDI$) (=hydrogenated MDI), commercially available from BASF Polyurethane Elastomers Co., Ltd.; JIS-A hardness: 85
*3: Elastollan XNY90A (trade name), polyurethane-based thermoplastic elastomer formed by using 4,4'-dicyclohexylmethane diisocyanate ($H_{12}MDI$) (=hydrogenated MDI), commercially available from BASF Polyurethane Elastomers Co., Ltd.; JIS-A hardness: 90
*4: Elastollan XNY97A (trade name), polyurethane-based thermoplastic elastomer formed by using 4,4'-dicyclohexylmethane diisocyanate ($H_{12}MDI$) (=hydrogenated MDI), commercially available from BASF Polyurethane Elastomers Co., Ltd.; JIS-A hardness: 97
*5: Surlyn 8945 (trade name), ethylene-methacrylic acid copolymer ionomer resin obtained by neutralizing with sodium ion, manufactured by Du Pont Co.
*6: Hi-milan AM7316 (trade name), ethylene-methacrylic acid-acrylic acid ester terpolymer ionomer resin obtained by neutralizing with zinc ion, manufactured by Du Pont-Mitsui Polychemicals Co., Ltd.

Examples 1 to 3 and Comparative Examples 1 to 7

The cover composition was preliminary shaped into semi-spherical half-shell for the cover by injection molding, encapsulating the resulting two-layer structured core produced in the step (ii) with the two half-shells, followed by press-molding in the mold at 165° C. for 1 minute to form a cover layer having a thickness of 0.8 mm. Then, clear paint was coated on the surface of the cover layer to obtain a golf ball having a diameter of 42.8 mm and a weight of 45.3 g. With respect to the resulting golf balls, the flight performance, shot feel and scuff resistance were measured or evaluated. The results are shown in Tables 6 and 7. The test methods are as follows.

(Test Method)
(1) Hardness
(i) Hardness of Center

The surface hardness of the center is determined by measuring a JIS-A hardness at the surface of the center prepared. The central point hardness of the center is determined by measuring JIS-A hardness at the central point of the center in section, after the resulting center is cut into two equal parts. The JIS-A hardness (which is substantially the same as Shore A hardness) was measured by using an automatic rubber hardness tester (type LA1), which is commercially available from Kobunshi Keiki Co., Ltd., with a JIS-A hardness meter according to JIS K 6253.

(ii) Hardness of Intermediate Layer

The surface hardness of the intermediate layer is determined by measuring a hardness in Shore D hardness at the surface of the core having two-layered structure, which is formed by integrally press-molding the intermediate layer on the center. The Shore D hardness was measured by using an automatic rubber hardness tester (type LA1), which is commercially available from Kobunshi Keiki Co., Ltd., with a Shore D hardness meter according to ASTM D 2240.

(iii) Hardness of Cover

The hardness of the cover is determined by measuring a hardness in Shore D hardness, using a sample of a stack of the three or more heat and press molded sheets having a thickness of about 2 mm from each cover composition, which had been stored at 23° C. for 2 weeks. The Shore D hardness was measured by using an automatic rubber hardness tester (type LA1), which is commercially available from Kobunshi Keiki Co., Ltd., with a Shore D hardness meter according to ASTM D 2240.

(2) Deformation Amount of Core

The deformation amount of the core is determined by measuring a deformation amount, when applying from an initial load of 98 N to a final load of 1274 N on the core.

(3) Flight Performance (i) Flight Performance (1)

After a No. 1 wood club (a driver, W#1; "XXIO" loft angle=8 degrees, X shaft, manufactured by Sumitomo Rubber Industries, Ltd.) having metal head was mounted to a swing robot manufactured by Golf Laboratory Co. and each golf ball was hit at head speed of 50 m/sec, the initial velocity and spin amount (backspin amount) immediately after hitting, and flight distance were measured. As the flight distance, total that is a distance to the stop point of the hit golf ball was measured. The measurement was conducted 12 times for each golf ball (n=12), and the average is shown as the result of the golf ball.

(ii) Flight Performance (2)

After a sand wedge (SW; "DP-601", manufactured by Sumitomo Rubber Industries, Ltd.) was mounted to a swing robot manufactured by Golf Laboratory Co. and each golf ball was hit at head speed of 21 m/sec, the spin amount (backspin amount) immediately after hitting was measured. The measurement was conducted 12 times for each golf ball (n=12), and the average is shown as the result of the golf ball.

(4) Shot Feel

The shot feel of the golf ball is evaluated by 10 golfers according to a practical hitting test using a No. 1 wood club (W#1, a driver) having a metal head. The evaluation criteria are as follows. The results shown in the Tables below are based on the fact that the most golfers evaluated with the same criterion about shot feel.

(i) Shot Feel (1)

Evaluation Criteria I (Impact Force)

o: The golfers felt that the golf ball has good shot feel such that impact force at the time of hitting is small.

Δ: The golfers felt that the golf ball has fairly good shot feel.

x: The golfers felt that the golf ball has poor shot feel such that impact force at the time of hitting is large.

(ii) Shot Feel (2)

Evaluation Criteria II (Rebound Characteristics)

o: The golfers felt that the golf ball has, and good shot feel such that rebound characteristics are good.

Δ: The golfers felt that the golf ball has fairly good shot feel.

x: The golfers felt that the golf ball has heavy and poor shot feel such that rebound characteristics are poor.

(5) Scuff Resistance

After a pitching wedge (PW; "Newbreed Tour Forged", manufactured by Sumitomo Rubber Industries, Ltd.) commercially available was mounted to a swing robot manufactured by True Temper Co., two points on the surface of each golf ball was hit at a head speed of 36 m/sec one time for each point. The two points were evaluated by checking the surface appearance by visual observation. The evaluation criteria are as follows.

Evaluation Criteria o: The surface of the golf ball slightly has a cut, but it is not particularly noticeable.

Δ: The surface of the golf ball clearly has a cut, and the surface becomes fluffy.

x: The surface of the golf ball is considerably chipped off, and the surface noticeably becomes fluffy.

(Test Results)

TABLE 4

|  | Example No. | | | Comparative Example No. | |
| --- | --- | --- | --- | --- | --- |
| Test item | 1 | 2 | 3 | 1 | 2 |
| Core composition | A | B | C | D | E |
| (Center) | | | | | |
| Diameter (mm) | 12.0 | 15.0 | 19.0 | 15.0 | 15.0 |
| Weight (g) | 0.9 | 2.0 | 4.0 | 2.0 | 2.0 |
| Central point hardness (JIS-A) | 47 | 71 | 81 | 25 | 90 |
| Surface hardness (JIS-A) | 51 | 75 | 86 | 28 | 96 |
| (Intermediate layer) | | | | | |
| Thickness (mm) | 14.6 | 13.1 | 11.1 | 13.1 | 13.1 |
| Surface hardness (Shore D) | 67 | 65 | 62 | 67 | 60 |
| (Core) | | | | | |
| Deformation amount (mm) | 3.05 | 2.93 | 2.82 | 3.55 | 2.37 |
| (Cover) | | | | | |
| Composition | I | II | III | II | II |
| Hardness (Shore D) | 40 | 46 | 52 | 46 | 46 |

TABLE 5

|  | Comparative Example No. | | | | |
| --- | --- | --- | --- | --- | --- |
| Test item | 3 | 4 | 5 | 6 | 7 |
| Core composition | F | G | H | J | C |
| (Center) | | | | | |
| Diameter (mm) | 15.0 | 8.0 | 22.0 | 12.0 | 19.0 |
| Weight (g) | 2.0 | 0.3 | 6.2 | 0.9 | 4.0 |
| Central point hardness (JIS-A) | 90 | 48 | 80 | 47 | 81 |
| Surface hardness (JIS-A) | 96 | 50 | 86 | 51 | 86 |
| (Intermediate layer) | | | | | |
| Thickness (mm) | 13.1 | 16.6 | 9.6 | 14.6 | 11.1 |
| Surface hardness (Shore D) | 48 | 62 | 65 | 73 | 62 |
| (Core) | | | | | |
| Deformation amount (mm) | 2.83 | 2.98 | 3.45 | 2.65 | 2.82 |
| (Cover) | | | | | |
| Composition | II | II | II | II | IV |
| Hardness (Shore D) | 46 | 46 | 46 | 46 | 45 |

TABLE 6

| Test item | Example No. 1 | Example No. 2 | Example No. 3 | Comparative Example No. 1 | Comparative Example No. 2 |
|---|---|---|---|---|---|
| Flight performance (1) (W #1; 50 m/sec) | | | | | |
| Initial velocity (m/sec) | 71.9 | 72.1 | 72.2 | 71.1 | 72.3 |
| Spin amount (rpm) | 2530 | 2500 | 2480 | 2350 | 2630 |
| Total (m) | 270.5 | 271.0 | 271.3 | 265.5 | 267.3 |
| Flight performance (2) (SW; 21 m/sec) | | | | | |
| Spin amount (rpm) | 6850 | 6820 | 6780 | 6800 | 6850 |
| Shot feel (1) Impact | Δ | Δ | Δ | ○ | X |
| Shot feel (2) Rebound | ○ | ○ | ○ | X | ○ |
| Scuff resistance | ○ | ○ | ○ | ○ | ○ |

TABLE 7

| Test item | Comparative Example No. 3 | 4 | 5 | 6 | 7 |
|---|---|---|---|---|---|
| Flight performance (1) (W#1; 50 m/sec) | | | | | |
| Initial velocity (m/sec) | 72.0 | 72.3 | 71.2 | 72.3 | 71.3 |
| Spin amount (rpm) | 2680 | 2650 | 2390 | 2470 | 2510 |
| Total (m) | 266.8 | 267.0 | 266.0 | 267.8 | 265.0 |
| Flight performance (2) (SW; 21 m/sec) | | | | | |
| Spin amount (rpm) | 6770 | 6840 | 6750 | 6850 | 6840 |
| Shot feel (1) Impact | X | X | ○ | X | Δ |
| Shot feel (2) Rebound | ○ | ○ | X | ○ | X |
| Scuff resistance | ○ | ○ | ○ | ○ | X |

As is apparent from Tables 6 and 7, the golf balls of Examples 1 to 3 of the present invention, when compared with the golf balls of Comparative Examples 1 to 7, are superior in flight distance, spin performance, shot feel and scuff resistance.

On the other hand, in the golf ball of Comparative Example 1, since the center is too soft, the initial velocity when hit by a driver of the resulting golf ball is low, which reduces the flight distance. In addition, the shot feel is heavy and poor such that rebound characteristics are poor. In the golf ball of Comparative Example 2, since the center is too hard, the spin amount when hit by a driver is high, which reduces the flight distance. In addition, the shot feel is poor such that the impact force at the time of hitting is large.

In the golf ball of Comparative Example 3, since the center is hard and the surface hardness of the intermediate layer is too low, the spin amount when hit by a driver is high, which reduces the flight distance. In the golf ball of Comparative Example 4, since the diameter of the center is small, the spin amount when hit by a driver is high, which reduces the flight distance. In addition, the shot feel is poor such that rebound characteristics are poor.

In the golf ball of Comparative Example 5, since the diameter of the center is large, the initial velocity when hit by a driver of the resulting golf ball is low, which reduces the flight distance. In addition, the shot feel is poor such that rebound characteristics are poor. In the golf ball of Comparative Example 6, since the hardness of the intermediate layer is high, the spin amount when hit by a driver is high, which reduces the flight distance. In addition, the shoot feel is poor such that the impact force at the time of hitting is large. In the golf ball of Comparative Example 7, since the cover is formed from ionomer resin, the initial velocity at the time of hitting is low, which reduces the flight distance. In addition the scuff resistance is poor.

What is claimed is:

1. A multi-piece solid golf ball comprising a core composed of a center and an intermediate layer formed on the center, and a cover formed on the core, wherein the center has a diameter of 10 to 20 mm and a central point hardness in JIS-A hardness of 30 to 90, the intermediate layer has a surface hardness in Shore D hardness of 50 to 70 the cover comprises polyurethane-based thermoplastic elastomer as a main component, and has a hardness in Shore D hardness of 40 to 60 and a thickness of 0.3 to 1.5 mm.

2. The multi-piece solid golf ball according to claim 1, wherein the center and intermediate layer comprise cis-1,4-polybutadiene rubber as a main component.

3. The multi-piece solid golf ball according to claim 1, wherein the polyurethane-based thermoplastic elastomer is formed by using cycloaliphatic diisocyanate.

* * * * *